United States Patent
Taha et al.

(10) Patent No.: US 10,190,370 B1
(45) Date of Patent: Jan. 29, 2019

(54) COMPOSITE WELLBORE SEAL SYSTEM WITH SENSING AND SELF-HEALING CAPABILITIES

(71) Applicants: Mahmoud Reda Taha, Albuquerque, NM (US); John Stormont, Albuquerque, NM (US)

(72) Inventors: Mahmoud Reda Taha, Albuquerque, NM (US); John Stormont, Albuquerque, NM (US)

(73) Assignee: STC.UNM, Albuquerque, NM (US)

(*) Notice: Subject to any disclaimer, the term of this patent is extended or adjusted under 35 U.S.C. 154(b) by 410 days.

(21) Appl. No.: 14/965,356

(22) Filed: Dec. 10, 2015

Related U.S. Application Data

(60) Provisional application No. 62/090,258, filed on Dec. 10, 2014.

(51) Int. Cl.
*E21B 17/00* (2006.01)
*C09K 8/46* (2006.01)

(52) U.S. Cl.
CPC ........... *E21B 17/00* (2013.01); *C09K 8/46* (2013.01); *E21B 17/003* (2013.01); *C09K 2208/08* (2013.01); *C09K 2208/10* (2013.01)

(58) Field of Classification Search
CPC ........ E21B 17/00; E21B 17/003; E21B 33/13; E21B 33/138; E21B 33/14; C09K 8/46; C09K 2208/08; C09K 2208/10
See application file for complete search history.

(56) References Cited

U.S. PATENT DOCUMENTS

| | | | | |
|---|---|---|---|---|
| 5,649,568 | A * | 7/1997 | Allen | C04B 28/02 138/137 |
| 7,530,396 | B1 * | 5/2009 | Reddy | C04B 24/163 166/293 |
| 8,291,975 | B2 * | 10/2012 | Roddy | E21B 47/01 166/250.1 |
| 8,316,936 | B2 * | 11/2012 | Roddy | E21B 3/25 166/253.1 |
| 8,844,628 | B2 * | 9/2014 | Le Roy-Delage | C04B 24/36 106/671 |
| 2007/0066491 | A1 * | 3/2007 | Bicerano | C04B 16/082 507/117 |
| 2010/0307750 | A1 * | 12/2010 | Drochon | C09K 8/428 166/285 |
| 2013/0146286 | A1 * | 6/2013 | Le Roy-Delage | C04B 18/20 166/292 |
| 2016/0046853 | A1 * | 2/2016 | Chatterji | C09K 8/426 166/292 |
| 2017/0096874 | A1 * | 4/2017 | Parsons | E21B 33/14 |

* cited by examiner

*Primary Examiner* — Michael R Wills, III
(74) *Attorney, Agent, or Firm* — Keith A. Vogt; Vogt IP

(57) ABSTRACT

The present invention provides a self-healing wellbore seal system comprising a casing, a fiber reinforced polymer layer, and layer of polymer cement. The layers are bonded together and configured to create a low permeable and ductile seal at discrete locations of the wellbore or along the wellbore. The polymer layer may be chemically bonded to the casing and inhibits the formation of a microannulus at the casing. The polymer layer may be an aramid fiber reinforced polymer, a fiber reinforced polymer layer, or a glass reinforced polymer layer.

17 Claims, 1 Drawing Sheet

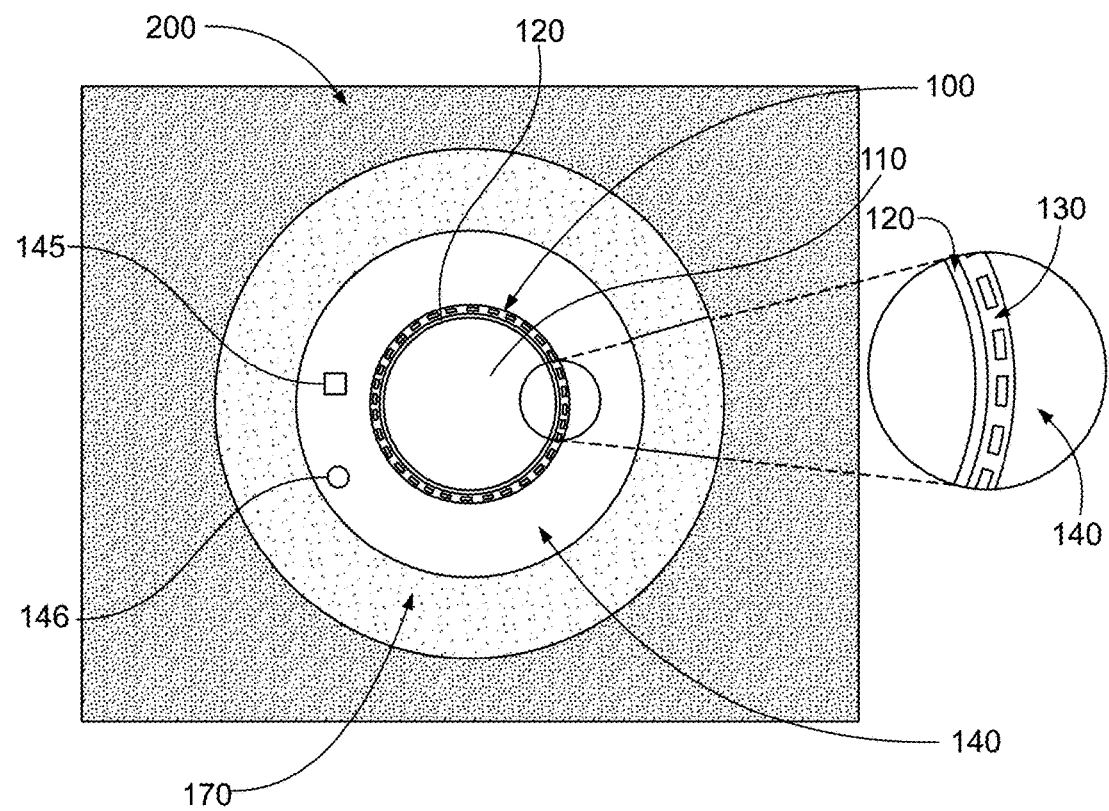

COMPOSITE WELLBORE SEAL SYSTEM WITH SENSING AND SELF-HEALING CAPABILITIES

RELATED APPLICATIONS

This application claims the benefit of U.S. Provisional Application No. 62/090,258 filed Dec. 10, 2014 and herein incorporated by reference.

STATEMENT REGARDING FEDERALLY SPONSORED RESEARCH & DEVELOPMENT

This invention was made with government support by the DOE under Grant Number DE-FE0009562. The government has certain rights in the invention.

INCORPORATION BY REFERENCE OF MATERIAL SUBMITTED ON A COMPACT DISC

Not applicable.

BACKGROUND OF THE INVENTION

This invention relates generally to wellbores and wellbore casings. Wellbores are formed in subterranean formations for various purposes including the extraction of oil and gas.

When a wellbore is created, a casing is installed in the borehole to prevent collapse of the borehole wall and to prevent undesired outflow or inflow of fluid from the formation into the borehole.

When an opening is formed in the sidewalls of an existing wellbore casing, whether through damage or some other event, it is often necessary to seal off the opening. Conventional methods of sealing, such as by excavation or re-lining, are expensive and unreliable.

A cement sheath is also often used to support the casing to prevent fluids from migrating between the various zones of the wellbore. In some instances, the bond between the cement sheath and the casing fails, producing a thin annular space between the exterior surface of the casing and the cement sheath. This is often referred to as a microannulus.

The microannulus can permit fluids to migrate between zones of the subterranean formation, which can reduce the quality and efficiency of production operations. Further, a microannulus can serve as a starting point for more significant failures in the casing, including those that lead to portions of the wellbore collapsing.

The present invention is directed to overcoming one or more of the limitations of the existing procedures for repairing wellbores.

The present invention is directed to and for inhibiting, reducing, repairing or preventing the formation of a microannulus.

BRIEF SUMMARY OF THE INVENTION

In one embodiment, the present invention provides a new composite system comprised of a plurality of layers for wellbore seal and integrity.

In another embodiment, the present invention provides a composite seal system where one or more layers is an order of magnitude below that of the conventional wellbore seal material, oil well cement (OWC).

In another embodiment, the present invention provides a composite seal system that remains bonded to the casing and seal material even as it undergoes large deformations because of the extraordinary bond strength.

In another embodiment, the present invention provides a composite seal system where the layers retain their favorable properties under a wide range of temperatures, pressures, and contact with potential wellbore fluids.

In another embodiment, the present invention provides a composite seal system engineered for expected environmental conditions and to seal against specific rock surfaces by changing the polymer matrix, fiber and nanomaterials.

In another embodiment, the present invention provides a new composite system with one or more layers having engineered surfaces using nanomaterials to improve the bond between steel casing and material in the annulus.

In another embodiment, the present invention provides a new composite system including a fiber reinforced polymer (FRP) layer that is well bonded to steel casing and to annulus material to improve strength and ductility of the wellbore system and thus eliminate cracking.

In another embodiment, the present invention provides a new composite system for replacing part of the steel at critical location(s) along the wellbore.

In another embodiment, the present invention provides a new engineered composite system having one or more layers with a graded stiffness that enables better stress transfer and eliminates the mismatch between steel casing and the annulus material and thus eliminates microcracking and debonding.

In another embodiment, the present invention provides a new composite system incorporating a surface engineered FRP wrapping to electrically separate the annulus material from the steel casing and thus enable continuous monitoring of the wellbore annulus conditions by continuously monitoring electrical conductivity and/or by the use of other transmissive means such as acoustic and/or imaging.

In another embodiment, the present invention provides a new composite system incorporating one or more layers with transmissive nanomaterials to enable continuous monitoring of wellbore integrity using electrical conductivity and/or other means (acoustic/imaging).

In another embodiment, the present invention provides a new composite system incorporating one or more layers with encapsulated nanomaterials for self-healing and/or self-sensing.

In another embodiment, the present invention maintains the integrity of the casing by the use of a composite seal that may be sensed and monitored from the borehole by exploiting the properties of the nanomaterials or changes of those properties during future debonding (e.g. acoustic or imaging signature).

In another embodiment, the present invention provides a wellbore casing system that will self-heal to restore its integrity if the system degrades from fatigue or other cracking or crack growth mechanisms.

In another embodiment, the present invention provides a composite seal system where the presence of flaws within the seal system can be detected from changes in the properties of the composite.

In another embodiment, the present invention provides a composite seal system that can detect the initiation of fatigue cracks and propagation.

In another embodiment, the present invention provides a composite seal system with self-healing capabilities using encapsulated nanomaterials that can be integrated with continuous monitoring.

In other embodiments, the system self-monitors and, when a fault is observed, the system locates the fault and deploys a self-healing capability.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 1 is a schematic of a composite wellbore seal system for an embodiment of the present invention.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed structure. Further, the terms and phrases used herein are not intended to be limiting, but rather to provide an understandable description of the invention.

According to one embodiment, as shown in FIG. 1, the present invention provides a seal system 100 configured to seal wellbore 110. The system includes casing 120, a fiber reinforced polymer (FRP) layer 130, and a layer of polymer cement, which may be a polymer cement nanocomposite (PCN) 140. The layers are configured to create a low permeability, ductile and well-bonded wellbore seal at discrete locations of the wellbore or along the entire wellbore.

A plurality of sensors/sensing technology (e.g. bandgap materials) 145 and self-healing materials 146 may be distributed within layers 130 and/or 140. The system may also include a well cement casing 170 that interfaces with the formation in which borehole 110 is formed, such as rock 200.

To inhibit, reduce or prevent the formation of a microannulus adjacent to casing 120, fiber reinforced polymer layer 130 wraps casing 120 adjacent to the seal location. The polymer, which may be chemically activated, bonds with layer 140 to act as a bonded interface between layers 120 and 130 that inhibits the formation of a microannulus at casing 120.

Layer 130 may be a fiber reinforced polymer layer (FRP). In addition, layer 130 may be a glass reinforced polymer (GFRP), carbon fiber reinforced polymer (CFRP), aramid fiber reinforced polymer (AFRP) or recycled fiber reinforced polymer (RFRP). All the above FRP materials might be produced using classical polymers or using special polymer nanocomposites to improve bond with steel cases and to prevent corrosion and crack propagation.

Layer 140 may be a polymer cement nanocomposite (PCN), or a polymer nanocomposite without cementing materials.

In another embodiment of the present invention, layers 130 and 140 are configured to promote wellbore seal and integrity. Layers 130 and 140 may be configured to have a graded stiffness that improves stress transfer and eliminates and/or reduces the mismatch between steel casing 120 and annulus material 170. Configuring the system in this manner inhibits, reduces or prevents microcracking and debonding.

The composite system may also be made with an engineered surface using nanomaterials to improve the bond between steel casing 120 and material 170 in the annulus. This includes but is not limited to nanoalumina, carbon nanotubes, boron nanotubes, graphene nanoplatelets and/or nanoclay particulates and other nanomaterials that can be engineered to achieve a desired level of stiffness gradation and improved bond strength.

In other embodiments, the composite system of the present invention may further include an FRP layer that is well bonded to the steel casing and to annulus material 170 to improve strength and ductility of the wellbore system and thus eliminate cracking. FRP materials provide reinforcement, improve ductility, strengthen the casing and blend with 140 to better bond to 170.

In a preferred embodiment, layers 130 and 140 have a graded stiffness that reduces and/or eliminates the stiffness mismatch between the casing (relatively stiff) and annulus material (relatively soft) which often causes shear cracks and debonding. The graded stiffness also allows the system to effectively absorb any shock (high magnitude transient load due to thermal effects).

In a preferred embodiment, the grading ranges from a high near the casing and decreases towards the annulus material. The decrease may be linear, non-linear or stepped and can be achieved by using a variety of nanomaterial content/concentrations and/or alignment.

In a further preferred embodiment, the grading starts with a section of a high stiffness that is similar to or matches the stiffness of steel casing 120 (CFRP or other type of FRP with high stiffness), reduces to a medium or lower stiffness (GFRP or other type of FRP with 30-50% of that of steel casing) to low stiffness (PCN layer 140 with 20-40% of that of GFRP). This arrangement provides an effective stress transfer from the steel casing to the formation material which may be rock.

In other embodiments, the present invention integrates layer 130 and layer 140 to improve the lateral strain capacity of layer 140 and hoop strength of layer 130. In a preferred embodiment, the present invention integrates an FRP layer 130 and PCN layer 140 to improve the lateral strain capacity of layer 140 and hoop strength of layer 130. This system replaces conventional unreinforced cement that is prone to cracking and debonding with a reinforced polymer cement system that is well bonded and reinforced.

In one embodiment, the present invention provides a composite wellbore system that can be sensed in situ to assess its integrity and will self-heal if it experiences a significant or predetermined degradation of its sealing capability. In a further embodiment, the present invention provides a composite system that incorporates a surface engineered FRP wrapping to electrically, acoustically or optically separate annulus material 170 from steel casing 120 and thus enables monitoring of the wellbore annulus conditions by monitoring electrical conductivity. Other transmission means such as acoustics and imaging may be used as well.

The system may also include electrically conductive nanomaterial fillers in layer 130 and/or layer 140 to enable monitoring of the wellbore integrity. Fillers that may be used in different fractions include conductive carbon black, carbon nanotubes, nanoalumina, boron nanotubes, silver coated glass hollow microspheres and various combinations thereof. The fillers permit the layers to electrically separate the annulus material from the steel casing and thus enable monitoring of the wellbore annulus conditions by monitoring electrical conductivity.

For example, the electrically conductive fillers, which may also include semi-conductive elements, are contained in a suitable binder polymer to create conductive paths having a particular resistance value. As a result, changes in the structure of the system will cause breaks in the conductive paths thereby increasing the measured resistance. The change in resistance may then be detected and used as an indicator of a change in the structure of the system.

In yet other embodiments, the layers may incorporate filaments integrated and interlinked to create an array of resistive elements in predetermined sections of the layers along the casing. This allows for the monitoring of different sections of the system.

In further embodiments, the present invention uses optically or acoustically conductive fillers (e.g. to create bandgap materials). These fillers may be arranged in a manner similar to the electrically conductive fillers. They may be arranged to provide feedback for particular sections of the casing or the entire system.

The detection systems of the present invention may be used to detect the presence of flaws within the seal system by detecting changes in the properties of the electrical, optical or acoustic signal. Moreover, the system may be used to detect the initiation of fatigue cracks and their propagation.

In yet other embodiments, the present invention provides self-healing capabilities. The system uses encapsulated nanomaterials that may be integrated with the monitoring described above. The integrity of the casing and/or composite seal can be sensed and monitored from the borehole by exploiting the properties of the transmissive properties of the nanomaterial fillers as described above.

If the system degrades from fatigue or other mechanisms, the seal will self-heal to restore its integrity. For one embodiment, self-actuating encapsulated nanomaterials may be distributed throughout or at predetermined locations in layer 130 and/or layer 140. Upon deformation or some other predetermined change in shape, the encapsulation is configured to rupture. Once ruptured, the sealing agents mix, react, and cure thereby sealing the affected area. In a similar embodiment, the sealing agents may be compartmentalized in a single unit that upon rupture seals the system.

In yet other embodiments, self-healing is performed by nanomaterials that, once forced into close proximity by a distortion in the casing, self-adhere by having surfaces with strong affinities for each other (e.g. clotting) or have hydrophobic/hydrophilic surfaces that are attractive in nature.

In yet other embodiments, the self-healing nanomaterials are activated by electrical, mechanical, optical or acoustic stimulation. The detection system described above may also be used as the self healing actuation means. Consequently, in this embodiment, the present invention may be used to observe the health of the system, locate a problem and actuate self-healing at the desired location.

In yet other embodiments, the present invention provides a self-healing wellbore seal system comprising a casing, a fiber reinforced polymer layer, and layer of polymer cement.

The layers may be bonded together and configured to create a low permeable and ductile seal at discrete locations of the wellbore or along the wellbore. The polymer layer may be chemically bonded to the casing and inhibits the formation of a microannulus at the casing. The polymer layer may be an aramid fiber reinforced polymer, a fiber reinforced polymer layer, or a glass reinforced polymer layer.

In other embodiments, the fiber reinforced polymer layer surrounds the casing at predetermined locations and further including an annulus material of cement that surrounds the polymer cement or polymer layer at predetermined locations. The polymer layer has a graded stiffness that decreases towards said annulus material.

In other embodiments, the casing is the innermost layer, the fiber reinforced polymer layer surrounds the casing at predetermined locations, and the polymer cement layer surrounds the fiber reinforced polymer layer at predetermined locations. The system may also include an annulus material of cement that surrounds the polymer cement layer at predetermined locations. In addition, the polymer cement layer has a graded stiffness that decreases towards the annulus material.

In other embodiments, the casing is the innermost layer, the fiber reinforced polymer layer surrounds the casing at predetermined locations, and the polymer cement layer surrounds the fiber reinforced polymer layer at predetermined locations. The system may also include an annulus material of cement that surrounds the polymer cement layer at predetermined locations. The fiber reinforced polymer layer and the polymer cement may have a graded stiffness that decreases towards said annulus material.

The graded stiffness in the fiber reinforced polymer layer may be the greatest at the casing and may be reduced by 30-50% of the stiffness of the casing at its lowest point. The graded stiffness in the polymer cement layer may be the greatest at the fiber reinforced polymer layer and may be reduced by 20-40% of the stiffness of the fiber reinforced polymer layer at its lowest point. In addition, the graded stiffness in the fiber reinforced polymer layer may be the greatest at the casing and may be reduced by 30-50% of the stiffness of the casing at its lowest point and the graded stiffness in the polymer cement layer may be the greatest at the fiber reinforced polymer layer and may be reduced by 20-40% of the stiffness of the fiber reinforced polymer layer at its lowest point.

In other aspects, one or both of the reinforced polymer layer and said polymer cement layer may be electrically, optically or acoustically conductive. One or both of the reinforced polymer layer and the polymer cement layer may include a plurality of electrically, optically or acoustically conductive pathways created by having therein electrically, optically or acoustically conductive fillers or filaments. One or both of the reinforced polymer layer and the polymer cement layer may also include a plurality of self-healing particles, the particles are configured to activate a sealing agent in response to a compromise in the integrity of the system. The particles may also be configured to activate a sealing agent in response to predetermined structural changes in one or more layers of the system. The particles may also be configured to activate a sealing agent in response to an electrical, acoustic or optical signal. The particles may also be configured to activate a sealing agent in an area where there is an increase in the measured resistance of the electrical signal. The particles may encapsulate the sealing agent or may be the sealing agent.

In other aspects, the polymer cement may be a nanocomposite. In other aspects, the polymer cement may be a polymer nanocomposite.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

What is claimed is:

1. A wellbore seal system comprising: a casing, a fiber reinforced polymer layer, and layer of polymer cement;
   said layers bonded together and configured to create a low permeable and ductile seal at discrete locations of the wellbore or along the wellbore;
   said polymer layer is chemically bonded to said casing and inhibits the formation of a microannulus at said casing; and
   said polymer layer is an aramid fiber reinforced polymer or is a glass reinforced polymer.

2. The wellbore seal system of claim 1 wherein said fiber reinforced polymer layer surrounds said casing at predetermined locations and further including an annulus material of cement that surrounds said polymer cement or polymer layer at predetermined locations; and
   said fiber reinforced polymer layer has a graded stiffness that decreases towards said annulus material.

3. The wellbore seal system of claim 2 wherein said graded stiffness in said fiber reinforced polymer layer is the greatest at said casing and is reduced by 30-50% of the stiffness of said casing at its lowest point.

4. The wellbore seal system of claim 1 wherein said casing is the innermost layer, said fiber reinforced polymer layer surrounds said casing at predetermined locations, said polymer cement layer surrounds said fiber reinforced polymer layer at predetermined locations and further including an annulus material of cement that surrounds said polymer cement layer at predetermined locations; and
   said polymer cement layer has a graded stiffness that decreases towards said annulus material.

5. The wellbore seal system of claim 4 wherein said graded stiffness in said polymer cement layer is the greatest at said fiber reinforced polymer layer and is reduced by 20-40% of the stiffness of said fiber reinforced polymer layer at its lowest point.

6. The wellbore seal system of claim 1 wherein said casing is the innermost layer, said fiber reinforced polymer layer surrounds said casing at predetermined locations, said polymer cement layer surrounds said fiber reinforced polymer layer at predetermined locations and further including an annulus material of cement that surrounds said polymer cement layer at predetermined locations; and
   said fiber reinforced polymer layer and said polymer cement have a graded stiffness that decreases towards said annulus material.

7. The wellbore seal system of claim 6 wherein said graded stiffness in said fiber reinforced polymer layer is the greatest at said casing and is reduced by 30-50% of the stiffness of said casing at its lowest point; and
   said graded stiffness in said polymer cement layer is the greatest at said fiber reinforced polymer layer and is reduced by 20-40% of the stiffness of said fiber reinforced polymer layer at its lowest point.

8. The wellbore seal system of claim 7 wherein one or both of said reinforced polymer layer and said polymer cement layer is electrically, optically or acoustically conductive.

9. The wellbore seal system of claim 7 wherein one or both of said reinforced polymer layer and said polymer cement layer include a plurality of electrically, optically or acoustically conductive pathways created by having therein electrically, optically or acoustically conductive fillers or filaments.

10. The wellbore seal system of claim 7 wherein one or both of said reinforced polymer layer and said polymer cement layer include a plurality of self-healing particles, said particles configured to activate a sealing agent in response to a compromise in the integrity of the system.

11. The wellbore seal system of claim 10 wherein one or both of said reinforced polymer layer and said polymer cement layer include a plurality of self-healing particles, said particles configured to activate a sealing agent in response to one or more predetermined structural changes in one or more layers of said system.

12. The wellbore seal system of claim 10 wherein one or both of said reinforced polymer layer and said polymer cement layer include a plurality of self-healing particles, said particles configured to activate a sealing agent in response to an electrical, acoustic or optical signal.

13. The wellbore seal system of claim 10 wherein one or both of said reinforced polymer layer and said polymer cement layer include a plurality of self-healing particles, said particles configured to activate a sealing agent in an area where there is an increase in the measured resistance of the electrical signal.

14. The wellbore seal system of claim 10 wherein said particles encapsulate the sealing agent.

15. The wellbore seal system of claim 10 wherein said particles are the sealing agent.

16. The wellbore seal system of claim 1 wherein said polymer cement is a nanocomposite.

17. The wellbore seal system of claim 1 wherein said polymer cement is a polymer nanocomposite.

* * * * *